United States Patent Office 3,345,382
Patented Oct. 3, 1967

3,345,382
PREPARATION OF HYDROXYAROMATIC
COMPOUNDS
Ross A. Kremer, Edison, N.J., assignor to Mobil Oil
Corporation, a corporation of New York
No Drawing. Filed May 13, 1965, Ser. No. 455,604
12 Claims. (Cl. 260—330.5)

This invention relates to the manufacture of hydroxyaromatic compounds, such as 4-hydroxybenzothiophene. It is particularly concerned with an improved vapor phase synthesis of them.

The compound, 4-hydroxybenzothiophene, is an organic intermediate for the synthesis of N-substituted benzothienylcarbamates, which have excellent pesticidal properties (see Belgian Patent No. 638,684). This intermediate has been prepared by reaction of a 4-keto-4,5,6,7-tetrahydrobenzothiophene and sulfur by Fieser and Kennelly [J. Am. Chem. Soc., 57, 1611–1616 (1935)]. They reported the best yields obtained were 46%. The use of other dehydrogenation methods, such as catalytic dehydrogenation, is hampered by the nature of the material to be dehydrogenated. Care must be taken to avoid substantial conversion to benzothiophene, which would be a total loss to the process.

Other hydroxy aromatic compounds, such as phenol, are well known to the art, as are their uses. Thus, o-propylphenol has been reacted with ethylene oxide to form a detergent and wetting agent (German Patent 935,603). Xylenols have been reacted with aledehydes to form phenolic resins [Ellis, "Chemistry of Synthetic Resins," pages 366–370 (1935)]. Alpha-naphthol is used medicinally as an antifermentative and antiseptic and also as an intermediate for the preparation of dyes ["Encyclopedia of Chemical Technology," vol. 9, pages 248–9 (1952)]. o-Cyanophenol (salicylonitrile) is a disinfectant (German Patent 538,319). 5-hydroxyquinoline is converted to an n-methylcarbamate by reaction with methylisocyanate. This carbamate is an effective parasiticide (U.S. 3,005,823). 4-hydroxybenzofuran is converted to karanjic acid (J. Chem. Soc., 1939, 1424) which is reacted with acetophenone to form pongamol (J. Chem. Soc., 1955, 2048). 4-hydroxybenzofuran can also be converted to karanjin (J. Chem. Soc., 1948, 894). Pongamol and karanjin are both known fish poisons [Indian J. Pharm., 3, 3–7 (1941)]. Karanjin also suppresses growth of *Mycobacterium tuberculosis* [Indian J. Pharm. 22, 34 (1960)].

Several methods have been proposed for the preparation of hydroxyaromatic compounds. For example, phenolic compounds have been produced by dehydrogenation of an at least partially saturated cycloketone by contact with a platinum metal catalyst. It is necessary, however, to carry out the reaction in the presence of added hydrogen to maintain catalyst activity.

It has now been found that partially saturated cycloketones can be catalytically dehydrogenated to the corresponding hydroxyaromatic compound, without the necessity of using added hydrogen. It is a discovery of this invention that hydrogenated cycloketones, such as hydrogenated ketobenzothiophenes, can be dehydrogenated in high yield to hydroxyaromatic compounds, such as 4-hydroxybenzothiophene, in vapor phase contact with metal oxide catalysts of Groups VI–B and VIII (iron subgroup) metals, at substantially atmospheric pressure, and in the absence of added hydrogen.

Accordingly, a broad object of this invention is to provide an improved process for preparing hydroxyaromatic compounds. Another object is to provide an improved catalytic vapor phase process for the dehydrogenation of a hydrogenated cycloketone reactant. A specific object is to provide an improved catalystic vapor phase process for dehydrogenating a hydrogenated ketobenzothiophene reactant to 4-hydroxybenzothiophene. Another specific object is to provide a catalytic vapor phase process for dehydrogenating a hydrogenated cycloketone reactant to its corresponding hydroxyaromatic compound. Other objects and advantages of this invention will become apparent to those skilled in the art, from the following detailed description.

This invention provides a process for producing a hydroxyaromatic compound that comprises contacting, in the vapor phase, a hydrogenated cycloketone reactant, in the absence of added hydrogen, with a metal oxide catalyst of Groups VI–B and VIII (iron subgroup) metals, together with water (steam), using a molar proportion of water to said cycloketone reactant of about 10 to 1:1, respectively.

The material that is dehydrogenated in the process of this invention is an at least partially hydrogenated cycloketone reactant. This reactant is an organic compound having at least one ring containing six carbon atoms, one of said carbon atoms having attached thereto a keto oxygen atom, and at least two of said carbon atoms being saturated with respect to hydrogen. It can be a single 6-member ring carbon compound or it can have a fused ring structure, i.e., a carbocyclic or heterocyclic ring fused to the six-carbon ring (e.g., tetrahydro-α-naphthalone). The saturated cycloketone reactant can be moderately substituted with lower alkyl ($C_1$–$C_3$) groups, nitrile groups or ester groups (—COOR) where R is a lower alkyl ($C_1$–$C_3$) group. Non-limiting examples of the saturated cycloketone reactant are cyclohexanone; 2-propylcyclohexanone; 2-cyanocyclohexanone; 2,5-dimethylcyclohexanone; tetrahydro-α-naphthalone; 5,6,7,8-tetrahydro-5-oxoquinoline; 3-cyclohexene-1-one; 4,5,6,7-tetrahydro-4-oxobenzofuran; 4,5,6,7-tetrahydro-4-oxobenzothiophene; 2,3,4,5,6,7-hexahydro-4-oxobenzothiophene, and 4,5,6,7-tetrahydro-6-methyl-4-oxobenzothiophene.

As has been mentioned hereinbefore the charge to the process of this invention contains hydrogenated cycloketone reactant and water (steam). An inert diluent gas such as nitrogen or flue gas may be used in addition to, or in place of steam, but it was found that optimum yields and catalytic activity are obtained when steam is used as the sole carrier gas.

The proportions of the components in the charge to the dehydrogenation process are about 10 to 1 moles water (steam): one mole saturated cycloketone reactant. When using a diluent gas in addition to steam, a typical, feasible feed ratio was found to be about 2 moles inert gas (nitrogen):about 1 mole steam:1 mole hydrogenated cycloketone reactant.

The catalysts used in the vapor phase process of this invention are oxides of metals of Groups VI–B and VIII (iron subgroup) of the Periodic Chart of the Elements. The Periodic Chart referred to is that appearing on pages 56 and 57 of Lange's Handbook of Chemistry, Tenth Edition (1961), published by Handbook Publishers, Inc., Sandusky, Ohio. The iron subgroup is Fe, Co, and Ni. Accordingly, the catalysts used are $Cr_2O_3$, $MoO_3$, $WO_3$, $Fe_2O_3$, $Ni_2O_3$, and $Co_2O_3$. Excellent yields have been attained using these catalytic oxides alone, without carrier or extenders. However, these catalytic oxide catalysts can be supported on inert supports such as Alundum, pumice, or α-alumina, or such active supports as activated alumina. Active supports which promote the detrimental dehydration reaction, resulting in considerable loss in yield of the desired hydroxyaromatic compound, must not be used. It is preferable to have at least 10% catalytic oxide when using supported catalysts. It has been found desirable to maintain the above catalysts in an air atmosphere for at last two hours at 600–700° C. prior to their use to achieve maximum catalytic activity and to destroy super active sites which would catalyze undesirable side reactions such as decomposition of the ketone molecule.

A unique feature of this process is that no added hydrogen is required to maintain catalytic activity. Accordingly, hydrogen is not charged to the process. Processes such as those using platinum group metal catalysts require the addition of hydrogen to maintain catalytic activity.

The process of this invention is operated in the vapor phase. Accordingly, the reaction temperature must be sufficiently high to vaporize the saturated cycloketone reactant. Generally, temperatures of between about 350° C. and about 700° C. are utilizable, but it is preferred to operate at between about 425° C. and about 600° C.

Preferably, this process is carried out continuously. In typical operation, the vaporized mixture of cycloketone reactant and steam, passes through a static bed (or fluidized static bed) of catalyst. The contact time of cycloketone reactant with the catalyst, which varies inversely with temperature, is between about 0.5 second and about 8 seconds, and preferably between about 1 second and about 6 seconds. This corresponds to LHSV (volume liquid charge/volume catalyst/hour) using the optimum feed ratio of between about 2.8 and about 0.2, preferably between about 1.4 and about 0.3.

*Example 1*

A feed mixture containing 4,5,6,7-tetrahydro-4-oxobenzothiophene was contacted in the vapor phase with a catalyst containing 20% w. $Fe_2O_3$ mounted on activated alumina at 525° C. The molar proportion of components in the feed mixture was 3 moles water:one mole 4,5,6,7-tetrahydro-4-oxobenzothiophene. The contact time of the cycloketone with the catalyst was 4 seconds. Analysis of the product showed, by weight, 84.1% 4-hydroxybenzothiophene, 10.0% 4,5,6,7-tetrahydro - 4 - oxobenzothiophene, and 5.9% byproducts.

*Example 2*

A feed mixture containing 4,5,6,7-tetrahydro-4-oxobenzothiophene was contacted in the vapor phase with a catalyst containing 10% w. $MoO_3$ mounted on activated alumina at 475–500° C. The molar proportion of components in the feed mixture was 3 moles water:one mole 4,5,6,7-tetrahydro-4-oxobenzothiophene. The contact time of the cycloketone with the catalyst was 4 seconds. Analysis of the product showed, by weight, 46.0% 4-hydroxybenzothiophene, 49.8% 4,5,6,7-tetrahydro - 4 - oxobenzothiophene, and 4.2% byproducts.

*Example 3*

A feed mixture containing 4,5,6,7-tetrahydro - 4 - oxobenzothiophene was contacted in the vapor phase with a 95% $Cr_2O_3$ catalyst at 625° C. The molar proportion of components in the feed mixture was 3 moles water:one mole 4,5,6,7-tetrahydro-4-oxobenzothiophene. The contact time of the cycloketone with the catalyst was 2 seconds. Analysis of the product showed, by weight, 82.0% 4-hydroxybenzothiophene, 3.4% 4,5,6,7-tetrahydro - 4 - oxobenzothiophene and 14.6% byproducts.

*Example 4*

A feed mixture containing cyclohexanone was contacted with a 100% $Cr_2O_3$ catalyst in the vapor phase at 600° C. The molar proportions of components in the feed mixture was 2 moles nitrogen:one mole water:one mole cyclohexanone. The contact time of cyclohexanone with catalyst was 2 seconds. Analysis showed the product to be, by weight, 86.0% phenol, 5.7% cyclohexanone, and 2.7% byproducts.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing a hydroxyaromatic compound that comprises contacting, in the vapor phase, a hydrogenated cycloketone reactant selected from the group consisting of cyclohexanone; 2-propylcyclohexanone; 2-cyanocyclohexanone; 2,5-dimethylcyclohexanone; tetrahydro-α-naphthalone; 5,6,7,8-tetrahydro-5-oxoquinoline; 3-cyclohexene-1-one; 4,5,6,7-tetrahydro-4-oxobenzofuran; 4,5,6,7-tetrahydro-4-oxobenzothiophene; 2,3,4,5,6,7-hexahydro-4-oxobenzothiophene, and 4,5,6,7-tetrahydro-6-methyl-4-oxobenzothiophene and water, in the absence of added hydrogen, with a catalyst consisting essentially of a metal oxide of Groups VI–B and VIII (iron subgroup) metals, using a molar proportion of water to said cycloketone reactant of about 10 to 1:1, respectively.

2. The process defined in claim 1, wherein said catalyst is $Cr_2O_3$.

3. The process defined in claim 1, wherein said catalyst is $Fe_2O_3$.

4. The process defined in claim 1, wherein said catalyst is $MoO_3$.

5. A process for producing 4-hydroxybenzothiophene that comprises contacting, in the vapor phase, 4,5,6,7-tetrahydro-4-oxobenzothiophene, in the absence of added hydrogen, with $Cr_2O_3$, together with water, using a molar proportion of water to said 4,5,6,7-tetrahydro-4-oxobenzothiophene of about 10 to 1:1, respectively.

6. The process defined in claim 5, wherein said molar proportion is about 3:1, respectively.

7. A process for producing 4-hydroxybenzothiophene that comprises contacting, in the vapor phase, 4,5,6,7-tetrahydro-4-oxobenzothiophene, in the absence of added hydrogen, with $Fe_2O_3$, together with water, using a molar proportion of water to said 4,5,6,7-tetrahydro-4-oxobenzothiophene of about 10 to 1:1, respectively.

8. The process defined in claim 7, wherein said molar proportion is about 3:1, respectively.

9. A process for producing 4-hydroxybenzothiophene that comprises contacting, in the vapor phase, 4,5,6,7-tetrahydro-4-oxobenzothiophene, in the absence of added hydrogen, with $MoO_3$, together with water, using a molar proportion of water to said 4,5,6,7-tetrahydro-4-oxobenzothiophene of about 10 to 1:1, respectively.

10. The process defined in claim 9, wherein said molar proportion is about 3:1, respectively.

11. A process for producing phenol that comprises contacting, in the vapor phase, cyclohexanone in the absence of added hydrogen, with $Cr_2O_3$ together with an inert gas carrier and water, using a molar proportion of inert carrier gas to water to cyclohexanone of about 10 to 1:about 5 to 1:1, respectively.

12. The process defined in claim 11, wherein said molar proportion is about 2:about 1:1.

References Cited

UNITED STATES PATENTS 2,708,208   5/1955   Furman et al. _____ 260—621

WALTER A. MODANCE, *Primary Examiner.*

JOHN D. RANDOLPH, *Examiner.*

C. M. SHURKO, *Assistant Examiner.*